United States Patent [19]
Kornhauser

[11] 3,999,532
[45] Dec. 28, 1976

[54] INTERNAL COMBUSTION ENGINE FUEL SYSTEM

[76] Inventor: Daniel W. Kornhauser, 15536 High Knoll Road, Encino, Calif. 91436

[22] Filed: Feb. 24, 1975

[21] Appl. No.: 552,221

Related U.S. Application Data

[63] Continuation of Ser. No. 418,533, Nov. 23, 1973, abandoned.

[52] U.S. Cl. .......................... 123/32 SP; 123/191 S
[51] Int. Cl.[2] ........................................ F02B 19/10
[58] Field of Search .......... 123/32 ST, 32 SP, 32 B, 123/191 S, 191 SP, 32 D

[56] References Cited
UNITED STATES PATENTS

| | | | |
|---|---|---|---|
| 2,184,357 | 12/1939 | Mallory | 123/32 ST |
| 2,907,308 | 10/1959 | Meurer | 123/32 B |
| 3,094,974 | 6/1963 | Barber | 123/32 ST |
| 3,283,751 | 11/1966 | Goossak | 123/32 ST |
| 3,439,656 | 4/1969 | Hideg | 123/32 ST |

Primary Examiner—Charles J. Myhre
Assistant Examiner—Ronald B. Cox
Attorney, Agent, or Firm—Harvey S. Hertz

[57] ABSTRACT

A fuel system for an internal combustion engine. Fuel is injected into a cavity formed between the cylinder head and the piston head of each cylinder and a relatively rich air-fuel mixture is created in a localized space. The amount of injected fuel and the timing of the injection remains constant for all speeds and loads. The injected fuel ignites, and supports the combustion of a lean air-fuel mixture drawn into the cylinder from a carburetor. The rich-fuel mixture is capable of being fired by conventional spark ignition, while the lean mixture is incapable of being ignited by this means. The preliminary combustion of the rich-fuel mixture is then used to fire the lean mixture. At all speeds and loads of the engine an excess of air is present so that virtually full combustion results.

9 Claims, 4 Drawing Figures

INTERNAL COMBUSTION ENGINE FUEL SYSTEM

This is a continuation of application Ser. No. 418,533, filed Nov. 23, 1973 and now abandoned.

BACKGROUND OF THE INVENTION

1. Field of the Invention

The field of art to which the invention pertains includes the field of internal combustion engine fuel systems, particularly with respect to a multi-mixture fuel system.

2. Description of the Prior Art

One approach for minimizing automotive pollution, without the use of expensive catalytic converters or thermal reactors to meet strict emission standards, has been the use of a stratified-charge engine. The stratified-charge engine operates on mixtures of fuel that are considerably more "lean" (a high ratio of air to gasoline) than standard engines presently utilize. The result is more complete combustion in the engines and greater reduction of polluting exhaust gases escaping from the vehicle tailpipe. In the stratified-charge engine, a mixture of fuel that would ordinarily be too lean for ignition by conventional spark ignition, is coaxed into burning by the ignition of an adjoining layer of much richer fuel. One technique for accomplishing this has been the addition of a small combustion chamber to accommodate the richer mixture at the top of each cylinder. This additional small chamber contains the spark plug and is equipped with its own intake valve. As the piston descends, the rich fuel mixture from one carburetor is drawn into the small combustion chamber near the spark plug. A leaner mixture from a second carburetor is fed into the main combustion chamber. The piston compresses both charges and in addition forces back most of the richer mixture in the small combustion chamber which may have seeped into the main chamber. The spark plug then fires the richer mixture which burns, igniting the adjoining lean mixture. Then, the expanding gases push the piston down and as the piston moves up again, the piston forces the spent gases through the open exhaust valve. The stratified-charge engine, in comparison to conventional engines, requires an extra carburetor, the additional parts needed to open and close a second intake valve on each cylinder, and the formation of the additional small combustion chamber adjacent to each main chamber.

Certain problems are encountered with the stratified-charge engines in changing speeds and loads due to the varying air and fuel speed ratios, particularly in the small combustion chamber. This causes difficulties in obtaining uniform acceleration rates.

Attempts have been made to improve combustion through the employment of a combined fuel injection system together with a carburetted fuel-air mixture. The approach has been to vary greatly both the amount of injected fuel as well as the timing of the injection, while simultaneously varying the amount and ratio of the carburetted fuel-air ratio. The complexity of such systems make them extremely sensitive and cause difficulty in obtaining satisfactory uniformity in required changes of speed and load. Furthermore, the major changes from current design of engines necessary to incorporate such design would be extremely expensive.

Known prior art includes U.S. Pat. Nos. 2,184,357; 2,534,346; 3,154,059; 3,294,072; 3,315,650; and 3,439,656.

The present invention operates on a mixture of fuel that is considerably more lean than standard engines presently operate on. Virtual complete combustion of the fuel is accomplished without the addition of an additional carburetor or a second intake valve in each cylinder. The present invention does not use a complex fuel injection system. The present invention can be utilized with standard internal combustion engines and modification thereof is relatively simple. Reduction of polluting exhaust gases is accomplished through the virtually complete combustion of the fuel.

SUMMARY OF THE INVENTION

The fuel system for an internal combustion engine contains an intake valve in each cylinder for providing a relatively lean fuel-air mixture into the combustion chamber. An exhaust valve provides an escape path from the combustion chamber for the spent gases. Fuel injection into the combustion chamber provides a relatively rich fuel-air mixture at a central partially confined portion of the combustion chamber. The rich mixture is ignited by conventional spark ignition, which in turn fires the relatively lean mixture.

The advantages of this invention, both as to its construction and mode of operation, will be readily appreciated as the same becomes better understood by reference to the following accompanying drawings in which like reference numerals designate like parts throughout the Figures.

DESCRIPTION OF THE PREFERRED EMBODIMENTS

Figure 1:
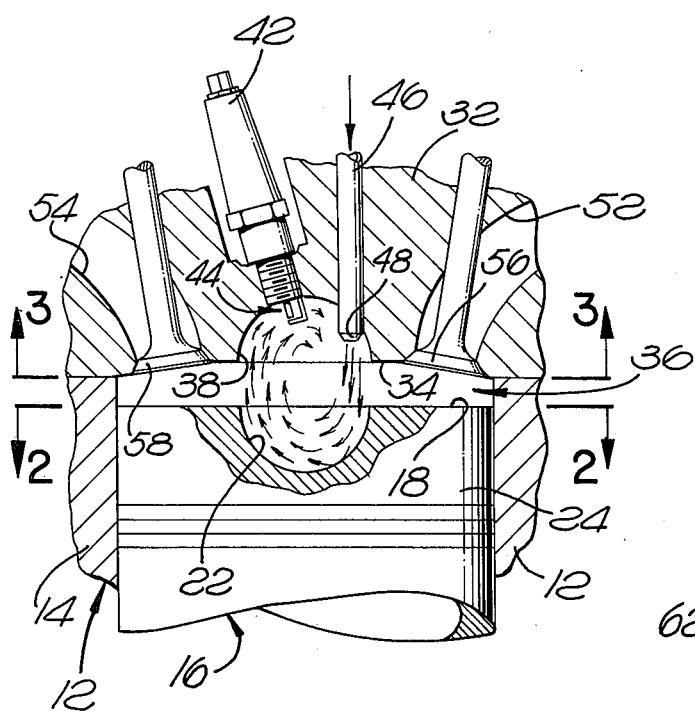
FIG. 1 is a fragmentary cross-sectional view taken across a cylinder of an internal combustion engine.
Figure 2:
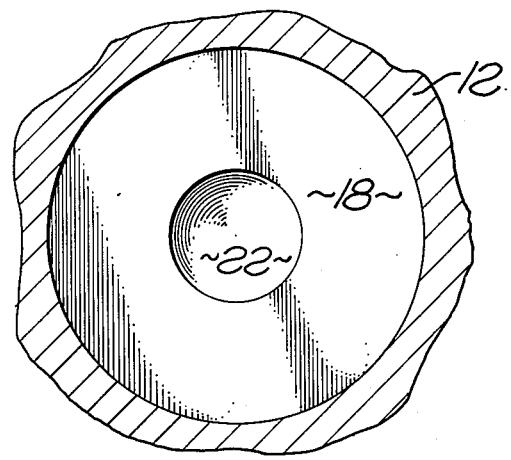
FIG. 2 is a cross-sectional view of the cylinder of FIG. 1 taken along the line 2—2 thereof.

Referring now to the drawings, FIG. 1 illustrates the preferred construction of one of the cylinders 12 of an internal combustion engine. It should be understood that the engine may have any desired number of such cylinders. The cylinder 12 is formed in a cylinder block 14 having a piston 16 mounted therein. The piston 16 contains a top surface 18. The piston 16 reciprocates by means of a piston rod (not shown). As illustrated in FIG. 2, a first hemispheric cavity 22 is formed in the piston top surface 18 which extends into the piston head 24.

A cylinder head 32 has a wall surface 34 adjacent to the piston top surface 18. The space between the piston wall surface 34 and the piston top surface 18 defines the combustion chamber 36 of the cylinder. A second hemispheric cavity 38 is formed in the cylinder head 32 wall surface 34 directly opposite the first cavity 22. A spark plug 42 is mounted in the cylinder head and has its electrodes 44 extending into the space defined by the second cavity 38.

Figure 3:
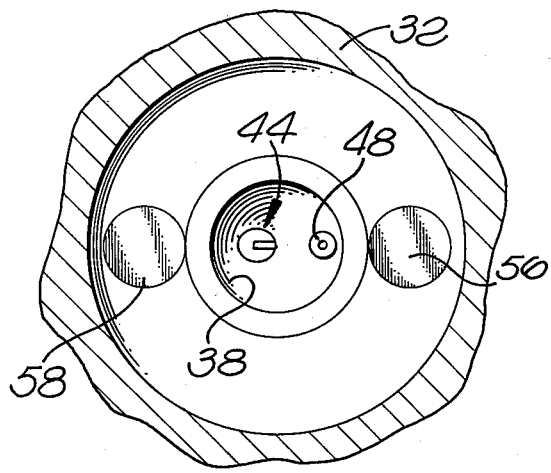
FIG. 3 is a cross-sectional view of a combustion chamber taken along the line 3—3 thereof.

A fuel injection nozzle 46 is also mounted in the cylinder head 32 with the nozzle opening 48 providing for fuel to be injected into the space defined by the cavities 22 and 38 in a plane perpendicular to the cylinder head wall surface 34 and piston top surface 18. The nozzle opening 48 is offset from the center of the cavity 38 in the cylinder head as can be seen more clearly in FIG. 3. An intake manifold 52 is also formed in the cylinder head on one side of the cavity 38 and an outlet manifold 54 formed on the other side thereof. The intake and outlet manifolds communicate with the combustion chamber 36 of the cylinder by means of a conventional intake valve 56 and an outlet valve 58, respectively.

A relatively rich fuel mixture is produced from fuel injected from the nozzle 46 into the cavities 22 and 38. The nozzle is offset in the cavity 38 and directed toward the edge of the cavity 22 causing the fuel to swirl around and tend to remain in the cavities as shown in FIG. 1. Prior to the injection of the fuel from the nozzle 46, during the conventional intake stroke, a relatively lean mixture is drawn from the intake manifold 52 into the combustion chamber 36 formed between the cylinder head and the piston head. The fuel injected from the nozzle 46 mixes with the lean mixture and creates a localized charge of air to fuel in the ratio of 8:1 to 12:1 by weight. This rich mixture is readily fired by the ignition of the spark plug 42.

The design of the cylinder head, the piston head, and the position of the fuel injection nozzle 46 causes the locally concentrated rich mixture in the partially restricted space of the cavities 22 and 38 to remain, until ignited, in close proximity to the spark gap at the electrodes 44. When the locally concentrated rich mixture formed in the cavities is fired, the lean mixture of fuel and air which has been drawn into the combustion chamber 36 from the intake manifold 52, is set off. Typically, the lean mixture of fuel from the passageway 52 can be in the neighborhood of 20:1 to 50:1, air to fuel, by weight. Such a lean mixture normally would not be able to be ignited with spark ignition from the electrodes 44, but when ignited by a primary combustion from the rich mixture in the cavities, the result is a relatively complete combustion having excess air present.

The carburetor which is used to supply the lean mixture into the intake manifold 52 is such that at all speeds and loads the total mixture in the cylinder resulting from the injected fuel from the nozzle 46 together with the carburetor fuel shall be leaner than 20:1. At idle speeds and at very low load conditions, the amount of fuel injected from the nozzle 46 is sufficient for operation of the engine, and the carburetor provides the necessary air but almost no fuel to the mixture. At increased loads and speeds, the carburetor provides additional fuel and air as needed, as the accelerator is depressed by the driver opening the fuel valve and throttle. However, the carburetor should be designed so that in no event will the total ratio in the combustion chamber exceed 20:1. Typically, the carburetor may be provided with a conventional choke for cold weather starting. Vacuum spark retardation may also be used.

The piston head cavity 22, the cylinder head cavity 38, and the fuel injection nozzle 46 are so designed that the injected fuel impinges on the cavity 22 in a direction such that it tends to conform to the space in the opposed cavities 22 and 38 and remains concentrated in that space and about the spark plug electrodes 44. The fuel from the nozzle 46 does not spread appreciably into the remainder of the space in the combustion chamber 36. The time of injection from the nozzle 46 is set at about 5° to 15° before top dead center and once properly adjusted for optimum performance is normally not changed in the operation of the engine. A single pump fuel injection system is used with appropriate valving for each cylinder.

Figure 4:
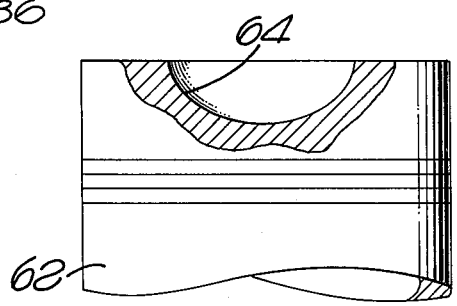
FIG. 4 is a partial cross-sectional view of an alternative configuration of the piston head.

FIG. 4 illustrates an alternative arrangement for forming the cavity in the piston head. In FIG. 4 the piston head 62 contains a semi-elliptoid cavity 64. This cavity can be used where it is desirable to maintain the injected fuel in a different configuration in the cavities formed in the cylinder head and the piston head. Of course, other configurations of the cavities in the cylinder head and piston head could be used, such as parabaloids or other combined shapes which cause the locally concentrated rich fuel mixture from the injected fuel to swirl appropriately in the cavities.

The design of the fuel system provides remarkably reduced exhaust pollutants and increased efficiency due to more nearly complete combustion of the fuel.

It should be understood that the system of the present invention can be used with fuels other than gasoline. It can be used also with a combination of fuels. For example, the injected fuel could be propane, natural gas, hydrogen, or alcohol, while the carburetted fuel introduced through the intake valve could be gasoline, kerosene, benzine, benzene, or other light hydrocarbons.

I claim:

1. A fuel system for an internal combustion engine of the spark ignition type having a cylinder and piston, an intake valve and exhaust valve, the improvement comprising:
   a central spherical cavity formed in the area between the cylinder head and the piston head to define a partially restricted central area spaced from the wall of said cylinder when the piston reaches an uppermost position;
   a conventional spark plug having electrodes which project into a central portion of the cavity adjacent the cylinder head;
   a fuel injection means for introducing a relatively rich fuel-to-air mixture into the partially restricted space formed by the central cavity between the cylinder head and the piston head;
   means for introducing a lean carburetted fuel-air mixture solely into the cylinder area intermediate said cylinder wall and said central area and symmetrically surrounding said central cavity through said intake valve during an intake stroke of said engine prior to introducing said relatively rich fuel-to-air mixture into said partially restricted space; and
   means for igniting said rich mixture of fuel in the central cavity by the use of said spark plug and subsequently igniting said relatively lean mixture in the cylinder area intermediate said cylinder wall and said central area surrounding said central cavity.

2. A fuel system for an internal combustion engine in accordance with claim 1 wherein the central portion of the combustion chamber is formed with a cavity in the piston head.

3. A fuel system for an internal combustion engine in accordance with claim 1 wherein the central portion of the combustion chamber is formed with said cavity in the cylinder head.

4. A fuel system for an internal combustion engine in accordance with claim 1 wherein counter-opposed cavities are formed in said piston head and cylinder head.

5. A fuel system for an internal combustion engine in accordance with claim 4 wherein fuel from said injected means impinges into the cavity in a direction wherein said injected fuel tends to conform to the counter-opposed cavities in the piston head and cylinder head and adjacent to the igniting means.

6. A fuel system for an internal combustion engine in accordance with claim 4 wherein fuel from said injected means impinges on the cavity in the piston head in a direction wherein such injected fuel tends to conform to the cavity in the piston head and adjacent said igniting means.

7. A fuel system for an internal combustion engine in accordance with claim 4 wherein fuel from said injected means impinges on the piston head in a direction wherein such injected fuel tends to conform to the cavity in the cylinder head and adjacent said igniting means.

8. A fuel system for an internal combustion engine in accordance with claim 4 wherein said counter-opposed cavities are shaped as hemisphere indentations in adjacent wall portions of said piston head and said cylinder head.

9. A fuel system for an internal combustion engine in accordance with claim 4 wherein said spark plug projects through said cylinder head cavity indentation.

* * * * *